United States Patent
Dettorre et al.

(10) Patent No.: US 12,064,931 B2
(45) Date of Patent: Aug. 20, 2024

(54) METHOD AND FACILITY FOR SUPPLYING ELASTOMERIC PRODUCTS

(71) Applicant: COMPAGNIE GENERALE DES ETABLISSEMENTS MICHELIN, Clermont-Ferrand (FR)

(72) Inventors: Jean-Marie Dettorre, Clermont-Ferrand (FR); Nicolas Jaunet, Clermont-Ferrand (FR); Herve Queraud, Clermont-Ferrand (FR); Stephane Ravat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 636 days.

(21) Appl. No.: 17/294,203

(22) PCT Filed: Nov. 13, 2019

(86) PCT No.: PCT/FR2019/052695
§ 371 (c)(1),
(2) Date: May 14, 2021

(87) PCT Pub. No.: WO2020/099782
PCT Pub. Date: May 22, 2020

(65) Prior Publication Data
US 2022/0001634 A1    Jan. 6, 2022

(30) Foreign Application Priority Data

Nov. 15, 2018    (FR) .................................. 1860542

(51) Int. Cl.
*B65H 19/12*    (2006.01)
*B29D 30/00*    (2006.01)
*B65H 19/18*    (2006.01)
*B65H 19/30*    (2006.01)
*B25J 11/00*    (2006.01)
*B66F 9/06*    (2006.01)

(52) U.S. Cl.
CPC ......... *B29D 30/0016* (2013.01); *B65H 19/12* (2013.01); *B65H 19/18* (2013.01);
(Continued)

(58) Field of Classification Search
CPC ........ B65H 19/12; B65H 19/18; B65H 19/30; B65H 2801/93; B29D 30/0016; B29D 2030/0022
See application file for complete search history.

(56) References Cited

U.S. PATENT DOCUMENTS

| 4,077,580 A | 3/1978 | Lang et al. |
| 5,085,377 A * | 2/1992 | Rohrer ................... B65G 37/02 414/273 |

(Continued)

FOREIGN PATENT DOCUMENTS

| CN | 104870177 A | 8/2015 |
| JP | 2000-25124 A | 1/2000 |
| WO | 2008/151875 A1 | 12/2008 |

OTHER PUBLICATIONS

International Search Report dated Mar. 26, 2020, in corresponding PCT/FR2019/052695 (4 pages).

*Primary Examiner* — Sang K Kim
(74) *Attorney, Agent, or Firm* — VENABLE LLP

(57) ABSTRACT

A method for supplying green tire manufacturing machines (14) with elastomeric products (12) by means of a supply facility (10) comprising a loading member (30) and at least one transfer member (34) comprising an unwinder (36) is disclosed. The supply facility comprises a preparation station (32), said preparation station comprising a manipulator arm (70), and at least one motor (53), the preparation station and the unwinder being distinct from the green tire manufacturing machine. The method comprises the following successive operations: loading the reel onto the unwinder; positioning the end of the product wound on the réel;

(Continued)

arranging the end of the product in such a way that it is laid on a dispenser of the unwinder; and transferring the reel from the preparation station to the green tire manufacturing machine.

10 Claims, 3 Drawing Sheets

(52) U.S. Cl.
CPC ............... *B65H 19/30* (2013.01); *B25J 11/00* (2013.01); *B29D 2030/0022* (2013.01); *B65H 2301/41374* (2013.01); *B65H 2301/41702* (2013.01); *B65H 2408/24* (2013.01); *B65H 2801/93* (2013.01); *B66F 9/063* (2013.01)

(56) References Cited

U.S. PATENT DOCUMENTS

| | | | |
|---|---|---|---|
| 6,138,938 A * | 10/2000 | Lehrieder | B65H 19/126 242/559.3 |
| 6,155,516 A * | 12/2000 | Lehrieder | B65H 19/12 242/559.3 |
| 7,485,201 B2 * | 2/2009 | De Paoli | B29D 30/005 156/111 |
| 7,543,775 B2 * | 6/2009 | Benvenuti | B65H 16/06 242/559.3 |
| 10,059,069 B2 | 8/2018 | Marchini et al. | |
| 2007/0068617 A1 * | 3/2007 | De Paoli | B65H 51/22 156/111 |
| 2007/0108336 A1 * | 5/2007 | Benvenuti | B65H 19/30 242/533.8 |
| 2014/0057769 A1 | 2/2014 | Steinemann et al. | |
| 2015/0343730 A1 | 12/2015 | Marchini et al. | |
| 2017/0157873 A1 | 6/2017 | Hinc et al. | |
| 2017/0233206 A1 * | 8/2017 | Wimmer | B65H 19/123 242/554 |
| 2017/0247214 A1 * | 8/2017 | Wimmer | B65H 19/12 |
| 2017/0326826 A1 | 11/2017 | Hinc et al. | |
| 2018/0141772 A1 * | 5/2018 | Prankl | B65H 19/12 |
| 2018/0345612 A1 | 12/2018 | Marcet et al. | |
| 2022/0009185 A1 | 1/2022 | Dettorre et al. | |

* cited by examiner

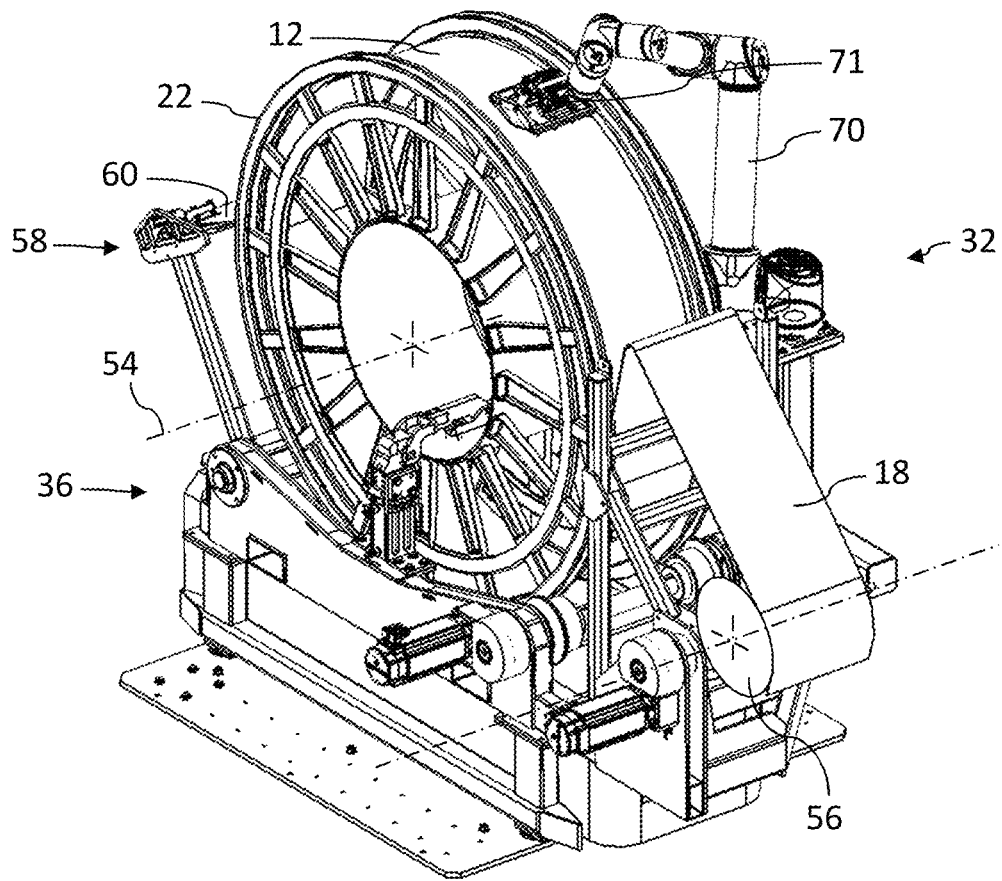
Fig. 5
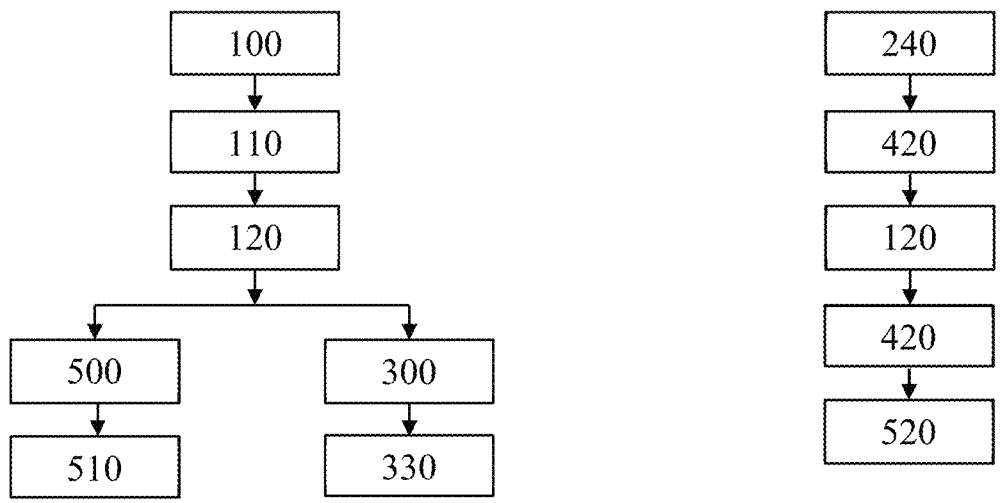
Fig. 6          Fig. 7

METHOD AND FACILITY FOR SUPPLYING ELASTOMERIC PRODUCTS

BACKGROUND

The present invention relates to the field of the manufacture of green tyres, and more particularly to a method and to a facility for supplying green tyre manufacturing machines with elastomeric products.

The elastomeric products used in the manufacture of green tyres generally come in the form of continuous plies or strips, possibly reinforced, and are laid on a non-stick backing also referred to as an interleaf. Each assembly made up of an interleaf and of a product is wound on a reel while the product is being stored and transported.

The green tyre manufacturing machine generally comprises a drum, laying stations and supply stations. The elastomeric products are laid circumferentially on the drum using the laying station so as to form a green tyre. Each laying station draws an elastomeric product from a supply station. The supply station unwinds the assembly made up of the interleaf and of the product from the reel, removing the interleaf, thus supplying the green tyre manufacturing machine with product. Each supply station therefore comprises a unwinder on which a reel is loaded, the unwinder allowing the product to be unwound from the reel. However, exchanging an empty reel for a full reel entails stopping the operations of laying a product on the drum, and this reduces the productivity of the machine.

A reel-change is generally performed by an operator. First of all, the unwinder belonging to the supply station rewinds the interleaf previously unwound with the product on the reel. The operator then removes the reel from the supply station of the machine and introduces a new reel thereinto. The end of the assembly formed of the product and of the interleaf is unwound from the new reel. The end of the product is separated from the end of the interleaf and joined together with the residual end of a previous product supplied to the machine, while the end of the interleaf is wound onto a bobbin of the supply station.

In order to avoid stopping the laying operations during the change of a reel, there is known a green tyre manufacturing machine comprising, downstream of the supply station and upstream of the laying station in the direction in which the product is drawn, a buffer stock which consists of a circuit along which the product is drawn and the purpose of which is to lengthen the path of the product. The buffer stock thus contains a sufficient quantity of product to supply the laying station and allow it to perform several laying operations while allowing the change of reel. However, the reel-change permissions may prove to be lengthier than initially anticipated, particularly when several reel-change mission instructions reach the operator simultaneously, and this, once again, causes laying operations to stop.

It is an objective of the invention to overcome the disadvantages of the prior art and to provide an original, automated and reliable solution that improves the ergonomics and the flexibility of a supply facility. It is another objective of the invention to reduce the reel-change time without stopping the product laying operations, while at the same time limiting the quantity of product stored in the buffer stock of the machine.

SUMMARY

This objective is achieved by the invention which proposes a method for supplying green tyre manufacturing machines with elastomeric products by means of a supply facility, each product being arranged on a non-stick backing, the assembly made up of the product and the non-stick backing being wound onto a reel, said facility comprising a loading member and at least one transfer member comprising a unwinder, the method being characterized in that the supply facility comprises a preparation station, said preparation station comprising a manipulator arm able to manipulate the product and the non-stick backing, and at least one motor able to drive the rotation of the reel loaded onto the unwinder, the preparation station and the unwinder being distinct from the green tyre manufacturing machine, the method comprising the following successive operations:

loading the reel onto the unwinder using the loading member, positioning the end of the assembly wound on the reel using the motor of the preparation station, arranging the end of the product and the end of the non-stick backing in such a way that the end of the product is laid on a dispenser of the unwinder and that the end of the non-stick backing is wound onto a bobbin of the unwinder, using the manipulator arm, transferring the reel from the preparation station to the green tyre manufacturing machine, using the first transfer member.

In other words, the method for supplying green tyre manufacturing machines with elastomeric products according to the invention uses partially or fully automated means, thereby making it possible to avoid the intervention of an operator for repetitive tasks that are somewhat unergonomic and offer no added value. The reel is prepared in such a way as to pre-position the interleaf and the product precisely so that the reel can be loaded quickly into the green tyre manufacturing machine. Thus, the operations of preparing the reel and the unwinder on which the reel is loaded are performed as a parallel operation, making it possible to reduce the risk of manufacturing machine stoppages, unlike the method of the prior art in which these operations are performed by the manufacturing machine.

Advantageously, the method comprises, upstream of the operation of loading the reel, the following operation:

transferring the reel from a storage area to the preparation station using an autonomous handling apparatus belonging to the supply facility.

Thus, the transfer operations prior to the operations of preparing a reel and a unwinder use automated machines, thereby making it possible to avoid the intervention of an operator. In addition, the use of an autonomous handling apparatus improves the precision of the load handling and therefore makes it possible to reduce the damage and wear to the supply facility that result from the knocks and friction that occur when the handling is not sufficiently precise. Finally, the transfer of the reels to the preparation station makes it possible to reduce the distances covered by the handling apparatus and thus optimize the use of the handling apparatus.

As a preference, the supply facility comprises a joining station, said joining station comprising a manipulator arm, the method comprising, downstream of the operation of transferring the reel into the green tyre manufacturing machine, the following operation: joining the end of the product to a residual end of a previous product supplying the green tyre manufacturing machine, using the manipulator arm.

Thus, the joining operations that follow the operations of preparing a reel and a unwinder use automated machines, thereby making it possible to avoid the intervention of an operator when the joining operations proceed as normal. In addition, should operator intervention prove necessary in the event of an incident, the use of a collaborative manipulator arm improves the accessibility to the joining station given the absence of a safety enclosure. Finally, the joining operation is easier and performed earlier on in comparison with the joining method of the prior art, because of the fact that the product is available beforehand, presented on the dispenser of the unwinder.

Advantageously, the method comprises, downstream of the joining operation, the following successive operations:

transferring the reel from the green tyre manufacturing machine to the preparation station, using the transfer member, winding the end of the product that is presented on the dispenser of the unwinder onto the reel in such a way that the end of the product is laid down onto the non-stick backing, and/or winding the non-stick backing onto the reel in such a way that the non-stick backing is no longer wound onto the bobbin, using the motor of the preparation station, unloading the reel from the unwinder using the loading member.

In other words, when there is a desire to remove the unwinder from the green tyre manufacturing machine, this can be done without the need to wait for the prior ancillary operations such as the rewinding of the interleaf onto the reel to have been completed, unlike in the method of the prior art. Thus, the operations ancillary to the removal of a reel are performed as parallel operations away from the green tyre manufacturing machine.

As a preference, the method comprises, downstream of the operation of unloading the reel, the following operation:

transferring the reel from the preparation station to the storage area using the handling apparatus.

As a preference, the reel is in a lying-down position in the storage area. Storing a reel in a lying-down position or, in other words, resting flat on one of its flanges, makes it possible to minimize the creep of the product while it is being stored, and thus improve the uniform distribution of the product in the manufacture of a green tyre.

Advantageously, the reel is in an upright position during the transfer operation using the transfer member. The transfer, as well as the operations prior to the transfer of a reel into the green tyre manufacturing machine, are made easier when the reel is in an upright position or, in other words, when the reel is resting vertically on the edge face of its flanges.

Advantageously, the loading member is arranged on the handling apparatus. A handling apparatus equipped with a loading means simplifies the supply facility by offering a flexible transfer and loading means capable of picking up a reel from a storage area at a height and setting it down on a unwinder. In addition, such an apparatus makes it possible to reduce the footprint of the supply facility in a tight space.

Another subject of the invention is a facility for supplying green tyre manufacturing machines with elastomeric products, each product being arranged on a non-stick backing, the assembly made up of the product and the non-stick backing being wound onto a reel, said facility comprising a loading member and at least one transfer member comprising a unwinder, said facility being characterized in that it comprises a preparation station, said preparation station comprising a manipulator arm able to manipulate the product and the non-stick backing, and at least one motor able to drive the rotation of the reel loaded onto the unwinder, the preparation station and the unwinder being distinct from the green tyre manufacturing machine.

As a preference, the facility comprises a control unit, said loading member, said preparation station and said transfer member each comprising means of communication with the control unit so as to receive mission instructions from the control unit and so as to communicate mission status information to the control unit.

BRIEF DESCRIPTION OF THE DRAWINGS

The invention will be better understood from the remainder of the description, which is based on the following figures:

FIG. 5 is a perspective view notably illustrating a preparation station of the supply facility of FIG. 1;

FIG. 6 is a block diagram illustrating operations of a method for transferring a unwinder;

FIG. 7 is a block diagram illustrating operations of a method for supplying elastomeric product.

DETAILED DESCRIPTION

In the various figures, elements that are identical or similar bear the same reference. Their description is therefore not systematically repeated.

Figure 1:
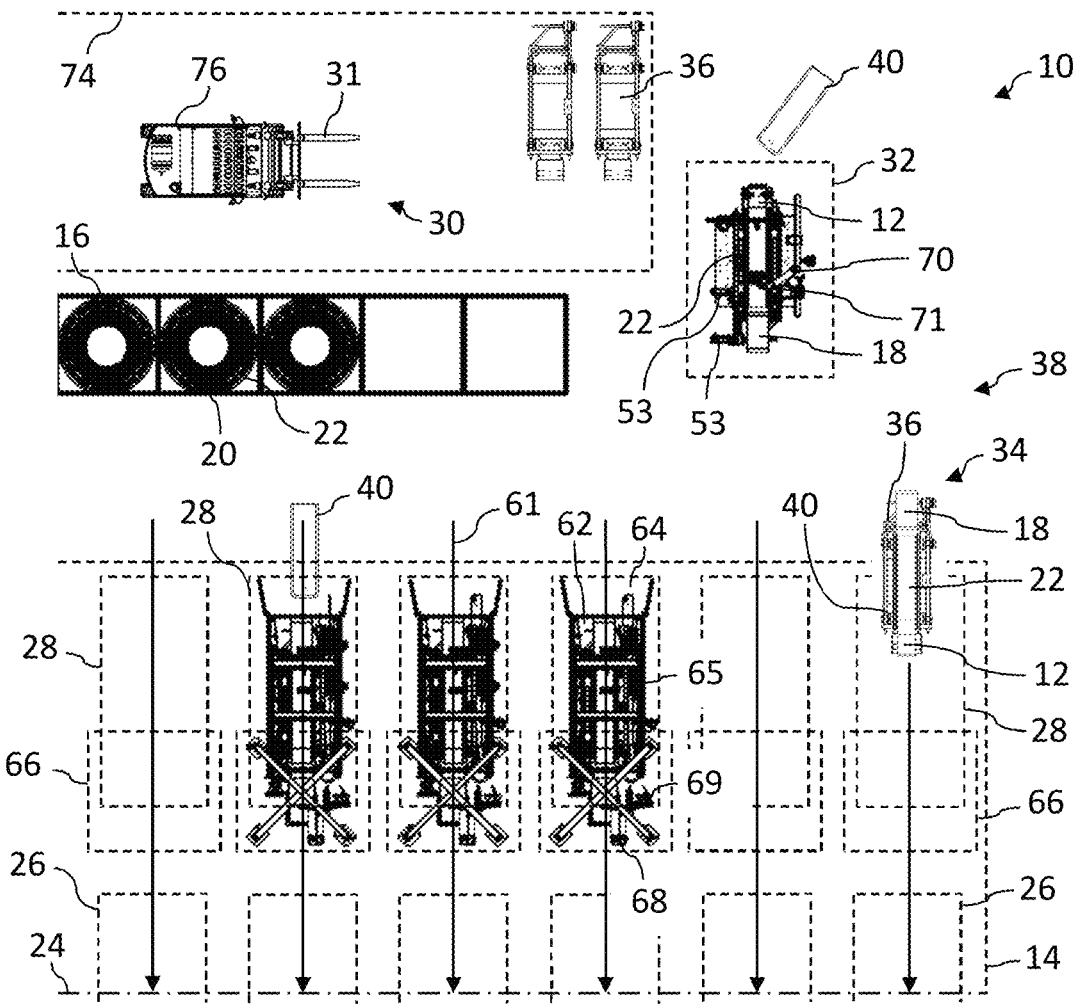
FIG. 1 is a view from above of a facility for supplying green tyre manufacturing machines with elastomeric products.

As illustrated in FIG. 1, the invention relates to a facility 10 for supplying green tyre manufacturing machines 14 with elastomeric products 12. The supply facility is situated downstream, in the direction of travel of the elastomeric products, of a storage area 16 for storing elastomeric products and upstream of green tyre manufacturing machines.

What is meant by an elastomeric product 12 is a product containing an elastomer matrix, possibly reinforced with textile or metal filamentary elements. The product 12 is continuous and takes the form of a ply, or else of one or more strips laid parallel to one another. The product is arranged longitudinally on a non-stick backing 18, also referred to as an interleaf, allowing the product to be stored and transported in the form of a wound roll 20. The assembly formed by the product and the non-stick backing is wound onto the core of a reel 22. In the storage area 16, the reel is arranged in a lying-down position. In other words, the reel lays flat on one of its flanges, and the roll 20 forms a cylinder of revolution of vertical axis. Having the reel in a lying-down position, allows the product 12 to hold its shape better.

The green tyre manufacturing machine 14 generally comprises a drum (not depicted) in the form of a cylinder of revolution having an axis of revolution 24 around which the drum is able to rotate and along which the drum is capable of translational movement. The manufacturing machine also comprises at least one laying station 26 and at least one supply station 28 respectively laying and supplying elastomeric products 12. The elastomeric products are laid circumferentially on the drum using the laying station so as to form a green tyre. As it is laid, each elastomeric product is drawn from the supply station. By way of example, a green tyre manufacturing machine particularly suitable for implementation of the supply facility 10 comprises a plurality of supply stations, arranged parallel to one another, perpendicular to the axis of revolution 24 of one or more drums.

The supply facility 10 notably comprises a loading member 30, a preparation station 32 and at least one transfer member 34 comprising a unwinder 36. The transfer member also forms part of a transfer facility 38 and is able to transfer a reel 22 from the preparation station to a supply station 28 supplying the green tyre manufacturing machine 14. By way of example, a supply facility comprises three transfer members for eight supply stations, and twenty-four unwinders. The loading member 30 is able to load a reel 22 onto a unwinder. The preparation station is notably able to wind or unwind the assembly formed by the product 12 and the non-stick backing 18.

Figure 4:
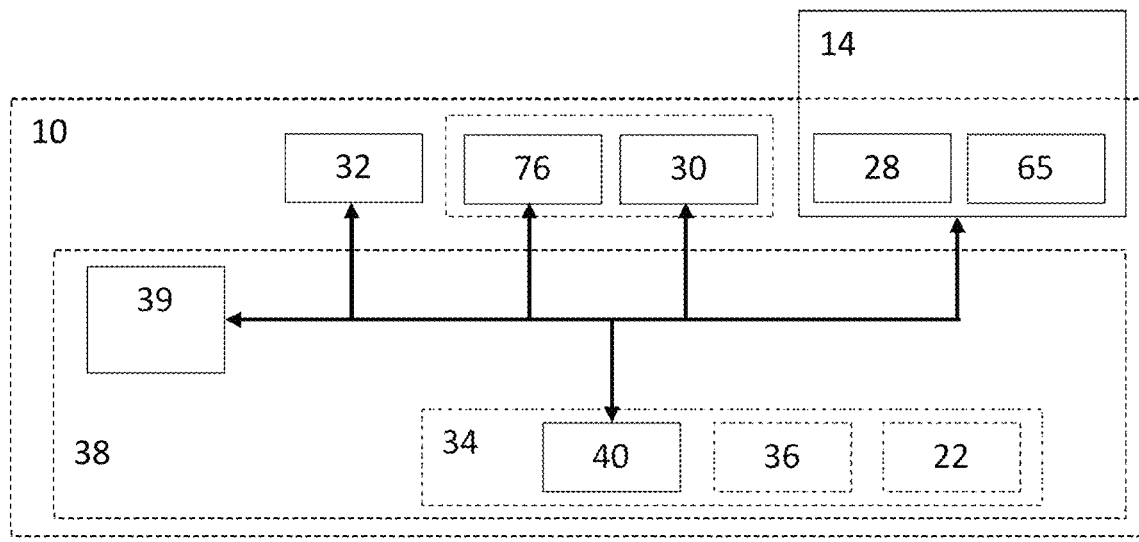
FIG. 4 is a block diagram illustrating the flow of communications between certain elements of the supply facility of FIG. 1.

The supply facility 10 and the transfer facility 38 comprise a control unit 39 (FIG. 4) belonging to an automated controller of a workshop in which a facility for supplying elastomeric products 12 and green tyre manufacturing machines 14 are situated. The transfer facility further comprises unwinders 36 and at least one mobile platform 40 able to support and to move a unwinder. The assembly formed by a mobile platform and a unwinder is also known as a reel 22 transfer member 34.

Figure 2:
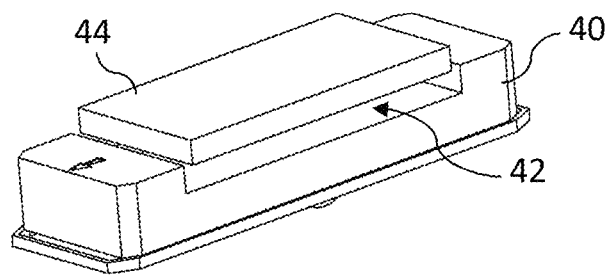
FIG. 2 is a perspective view illustrating a mobile platform of the supply facility of FIG. 1.

The mobile platform 40 illustrated in FIG. 2 is autonomous and is able to undertake missions of removing a unwinder 36 from or supplying a unwinder to the green tyre manufacturing machine 14. The control unit 39 programs and transmits the mission instructions to the mobile platforms. What is meant by autonomous is that the mobile platform is capable of moving without human intervention. The mobile platform comprises guidance means and means of communication with the control unit 39, for example using Wi-Fi. By way of example, the guidance of an autonomous mobile platform may be of the wire-guided, laser-guided, optically guided or else geoguidance type. As a preference, the guidance of an autonomous mobile platform is of the laser-guided type and uses algorithms of the SLAM type, allowing the platform to adapt to its environment. The autonomous mobile platforms 40 are flexible in use and do not require the creation of infrastructures or works. Thus it becomes easier to integrate the transfer facility 38 between the storage area 16 and the green tyre manufacturing machines 14.

The guidance means that guide the mobile platform 40 comprise sensors such as a radar to scan and identify the environment of the mobile platform and/or inertial units, or else magnetic references that allow the mobile platform to identify its location within its environment. The guidance means further comprise a microprocessor controller to calculate the path of the platform as a function of the target destination in a mission instruction transmitted to the mobile platform by the control unit 39, and of the data gathered by the sensors. The mobile platform also identifies any obstacles or individuals that might be present in its environment and may decide to calculate the most effective path for circumnavigating these and reaching its destination.

The platform 40 comprises a lifting device 42 which collaborates with a container such as a unwinder 36. The container, of generally rectangular shape, is supported by four points of contact and is designed so that when the container is resting on the ground on its points of contact and the lifting device is inactive, the platform can be positioned underneath the container. When the platform is positioned underneath a container and the lifting device is activated, the container is raised by the lifting device so that its four points of contact no longer rest on the ground. The mobile platform is thus able to move the container. The lifting device comprises a plate 44 that forms part of the upper surface of the platform, and an actuator (not depicted), such as a ram or a pantograph moved by a screw-nut system.

The mobile platform 40 comprises a chassis of generally rectangular shape. The chassis is supported by at least three wheels. By way of example, the chassis may have four or six wheels of which at least one wheel is driven. As a preference, each wheel can be oriented by an angle extending up to 90° so as to allow the mobile platform to dock with its destination, for example the supply station 28, sideways. Thus, the platform is highly manoeuvrable in a tight space. Each driven wheel is driven by an electric motor which is powered by electrical power supply batteries installed on the chassis of the mobile platform.

The transfer facility comprises a docking station (not illustrated) able to charge the batteries of a mobile platform 40. When the mobile platform is not on a removal or supply mission, the mobile platform moves to the station at which it connects itself to an electric charging terminal.

Figure 3:
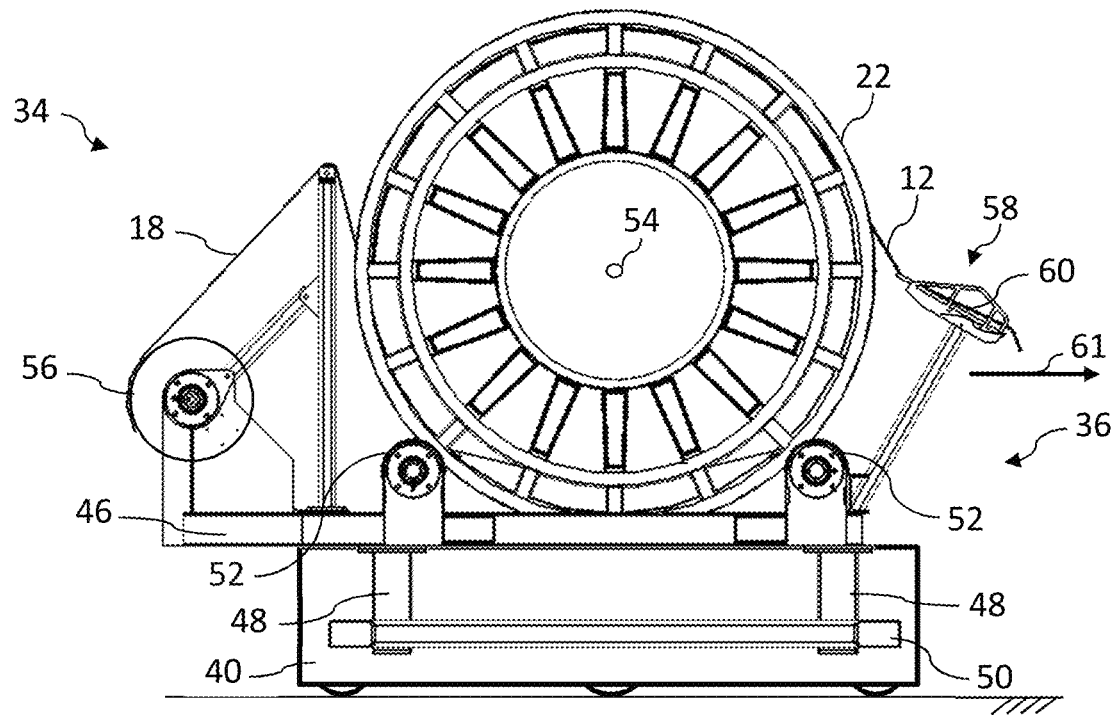
FIG. 3 is a side view illustrating certain elements of the supply facility of FIG. 1.

A unwinder 36 as illustrated in FIG. 3 comprises a chassis 46 of generally rectangular shape. The chassis is supported by four points of contact 48 arranged one at each corner of the chassis. The points of contact of the chassis are connected by two guides 50 along two opposite sides of the chassis. One guide has the function of making it easier for the mobile platform 40 to move in between the points of contact of the unwinder. A unwinder further comprises two parallel rollers 52, each roller being mounted with the ability to rotate with respect to the chassis 46. The rollers have the function of supporting a reel 22, and of allowing the elastomeric product 12 contained on the reel to be unwound or wound on. The rollers are made to rotate by at least one motor 53 incorporated into the chassis of the unwinder or, as a preference, incorporated into the supply stations 28 and preparation stations 32, in which case the motor comprises means of coupling to the rollers. The motor 53 drives a belt of the unwinder, which belt is connected to the rollers thus allowing them to be turned. A reel is placed in an upright position on the unwinder. In other words, the reel rests on the rollers via the edge face of its flanges, and the reel thus positioned is able to rotate about a horizontal axis 54.

A unwinder also comprises a bobbin 56 and a dispenser 58. What is meant by a bobbin is a reel that is small in size in comparison with the dimensions of the reel 22 containing the elastomeric product 12. The purpose of the bobbin is to receive, around its core, the self-adhesive backing 18 after this has been detached from the elastomeric product. The bobbin 56 is mounted with the ability to rotate with respect to the chassis 46 parallel to the axis of rotation 54 of the reel, on the rear face of the unwinder or, in other words, on the opposite side to the side from which the product is drawn. The bobbin is rotationally driven by means of a motor 53 so as to wind up or unwind the non-stick backing. By way of example, the motor is incorporated into the chassis 46 of the unwinder or, as a preference, incorporated into the supply station and preparation station, in which case the motor 53 comprises means of coupling to the rollers. The purpose of the dispenser 58 is to support the product to facilitate subsequent handling thereof. The dispenser comprises a tray 60 arranged on the front face of the unwinder or, in other words, in the direction 61 in which the product is drawn.

A supply station 28 comprises a housing 62 and at least one access 64 to the housing from outside the green tyre manufacturing machine 14. The access can be used by a mobile platform 40 loaded with a unwinder 36 or by a mobile platform on its own. The housing is able to house and precisely position a mobile platform loaded with a unwinder.

As a preference, the supply station comprises two accesses, for example a first access on the rear face of the supply station 28 in the opposite direction to the direction in which the product is drawn, and a second access (not depicted) on a lateral face of the supply station. Thus, as soon as the first mobile platform 40 has removed a unwinder from the housing 62 using the first access, a second mobile platform need not wait until the first mobile platform has vacated the first access to the housing. The second mobile platform can immediately access the vacated housing and thus reduce the time needed for changing a reel. The housing of the supply station is formed by a meshwork enclosure and access to the housing is formed by an opening in the enclosure. As a preference, the transfer facility comprises positioning studs arranged on the ground and allowing the mobile platform to position itself quickly and compensate for the lack of positional precision of a mobile platform.

A transfer facility 38 comprises means for evaluating the state of a reel 22. By way of example, the means for evaluating the state of a reel may be arranged on the unwinder 36, at the preparation station 32 or at the supply station 28. What is meant by the state of a reel is, for example, the identity or the location of the reel, the reference, the quantity, and the ageing deadline for the product contained on the reel, or else the temperature and relative humidity of the air in the environment surrounding the reel. The means for evaluating the state of a reel allow optimization of the quality of the products 12 supplied to a green tyre manufacturing machine 14, the operation and means necessary for the operation of the transfer facility 38.

The means for evaluating the state of a reel 22 notably comprise measurement means 65 for measuring the quantity of product 12 contained on the reel. As a preference, the measurement means for measuring the quantity of product are arranged on the green tyre manufacturing machines 14 and said communication means are coincident with the communication means of said manufacturing machines. Measuring the quantity of product wound on reels supported by unwinders 36 supplying the manufacturing machines 14 allows the mission instructions transmitted to the mobile platforms 40 for changing a reel to be anticipated, thus making it possible to minimize the usage and number of the mobile platforms.

The control unit 39 determines the moment at which to transmit a removal or supply mission instruction to a mobile platform 40 so that the mobile platform becomes positioned underneath the unwinder 36 that is intended to be removed from a manufacturing machine 14 before or at the moment at which the unwinder is to be removed, and/or in such a way that the unwinder intended to supply a green tyre manufacturing machine becomes positioned in the immediate vicinity of said green tyre manufacturing machine by means of a mobile platform before or at the moment at which the unwinder is to be transferred into the green tyre manufacturing machine.

By way of example, the measurement means take the form of a telemeter able to measure the distance separating it from the roll, so as to thus determine the diameter of the roll 20. Knowing the diameter of the roll provides an approximation of the length of product contained on the reel at more or less the perimeter of the roll at a given moment. The telemeter is preferably associated with a rotary encoder able to determine the angular position of the reel on the unwinder. Combining the measurements from the telemeter and from the encoder provides a more refined estimate of the length of product contained on the reel. The telemeter and the encoder are arranged at the preparation station 28 and connected to the controller of the manufacturing machine 14.

The unwinder 36 also comprises unwinder location means, such as a sensor of GPS type, or, for preference, a Bluetooth beacon. A Bluetooth beacon transmits its identity to a receiver that forms part of the transfer facility 38, and communicates with the control unit 39. The control unit is thus able to itemize the movements of the unwinders so as to determine and program optimized mission instructions. Knowing the movements of the unwinders also makes it possible to optimize the positioning of the various elements of a facility 10 for supplying elastomeric products 12 and/or for transferring a unwinder.

The green tyre manufacturing machine 14 further comprises a joining station 66 situated downstream of the supply station 28 and upstream of the laying station 26. The purpose of the joining station is to automatically join the end of the product 12 unwound from a reel 22 at the supply station to the residual end of a previous product supplying the green tyre manufacturing machine. To this end, the joining station comprises a collaborative manipulator arm 68. What is meant by manipulator arm is an automated manipulator arm of the six-axis anthropomorphic type, formed of a series of portions articulated to one another. What is meant by a collaborative manipulator arm is a manipulator arm able to collaborate with an operator without a safety enclosure. The collaborative manipulator arm comprises force or proximity sensors acting on said arm and detecting the approach of an operator or of an object. In addition, the collaborative manipulator arm is limited in speed and in force so as to reduce the severity of a collision with an operator. The segment at the free end of the manipulator arm comprises an effector 69, for example a gripper, able to cut the elastomeric product 12 in such a way that the ends that are to be butt-jointed together have uniform cross sections, and able to arrange and then compress said ends on one another in order to join them.

As illustrated in FIGS. 1 and 5, the preparation station 32 is situated upstream of the storage area 16 and downstream of the green tyre manufacturing machines 14, in the direction of circulation of the elastomeric products 12. The preparation station comprises a collaborative manipulator arm 70. The segment at the free end of the manipulator arm comprises an effector 71, for example a gripper, able to arrange the end of the product and the end of the non-stick backing 18 in such a way that the end of the product is laid on the dispenser 58 of the unwinder 36 and the end of the non-stick backing is wound onto a bobbin 56 of the unwinder.

The loading member 30 is situated on a loading area 74 and is able to load a reel 22 onto a unwinder 36. By way of example, the loading member takes the form of a manipulator arm equipped with a gripper able to manipulate a reel or, as a preference, with rotary forks 31 arranged on a handling apparatus 76. The handling apparatus is preferably of the autonomous forklift truck type. The rotary forks arranged on the autonomous forklift truck are able to pick up a reel from the storage area 16, pivoting it from a lying-down position to an upright position and set it down on the rollers 52 of a unwinder. The autonomous forklift truck is able to transfer a reel automatically between the storage area and a unwinder without the intervention of an operator. The handling apparatus comprises means of communication with the control unit 39 so as to receive instructions of missions for transferring and handling a reel, and so as to transmit state data, such as the position of the handling apparatus or the state of progress with the missions of transferring and handling a reel.

FIGS. 6 and 7 illustrate a method for supplying green tyre manufacturing machines 14 with elastomeric products 12, and a method for transferring unwinders 36 for supplying green tyre manufacturing machines with elastomeric products.

The quantity of product wound on reels 22 supported by unwinders 36 supplying the green-tyre manufacturing machines 14 is measured 100 using the evaluation means of each unwinder and the measured data are communicated 110 to a control unit 39 using the communication means of the manufacturing machine 14.

On the basis of the measured data, the control unit 39 is used to determine 120 the moment at which to transmit a removal or supply mission instruction to a mobile platform so that the mobile platform becomes positioned underneath the unwinder that is intended to be removed from a green tyre manufacturing machine before or at the moment at which the unwinder is to be removed, and/or in such a way that the unwinder intended to supply a green tyre manufacturing machine becomes positioned in the immediate vicinity of said green tyre manufacturing machine by means of a mobile platform before or at the moment at which the unwinder is to be transferred into the green tyre manufacturing machine.

A mission instruction is transmitted 200 to an autonomous handling apparatus 76 using a control unit 39. A reel 22 is picked up 210 from the storage area 16 using the loading member 30. The reel is pivoted 220 from a lying-down position into an upright position using the rotary forks of the loading member 30. The reel 22 is transferred 230 from the storage area 16 as far as a unwinder 36 using the handling apparatus 76 on which the rotary forks are arranged. The reel is set down 240 onto the rollers 52 of the unwinder using the loading member 30. The data regarding the state of progress of the mission are transmitted 250 to the control unit 39 using the communication means of the handling apparatus 76.

A mission instruction is transmitted 300 to an available mobile platform 40 using the control unit 39. The mobile platform is moved 310 as far as the unwinder 36 onto which a reel 22 has been loaded, and the unwinder is lifted 320 using a lifting device 42 of the mobile platform. The mobile platform is then moved 330 as far as a preparation station 32.

There is coupling 400 to the rollers 52 of the unwinder 36 then they are rotationally driven 410 using a motor belonging to the preparation station 32, thereby at the same time driving the rotation of the reel 22. The assembly formed by the product 12 and the non-stick backing is unwound and/or positioned 420 in such a way that the manipulator arm 70 of the preparation station is capable of taking hold of the end of the product and/or of the end of the non-stick backing. The end of the non-stick backing is arranged 430, using the manipulator arm, in such a way that it is placed on a bobbin 56 of the unwinder, and the end of the product is arranged 440 in such a way that it is placed on the tray 60 of a dispenser 58.

A mission instruction to remove or to supply a unwinder 36 is transmitted 500 to a mobile platform 40 using the control unit 39. The mobile platform is moved 510 in such a way that it becomes positioned underneath the unwinder 36 that is intended to be removed from a green tyre manufacturing machine, or the mobile platform supporting the unwinder intended to supply a green tyre manufacturing machine is moved 520 so that it becomes positioned in the immediate vicinity of the supply station 28 of the green tyre manufacturing machine 14.

A first mobile platform 40 supporting a first unwinder 36 intended to supply a green tyre manufacturing machine 14 is moved 600 into a position adjacent to a first access 54 belonging to a green tyre manufacturing machine 14. A second platform supporting a second unwinder is moved 610 through a second access belonging to a green tyre manufacturing machine 14 so as to remove the second unwinder from the housing. The first mobile platform is moved 620 through the first access and the first unwinder is housed 630 in the housing.

A motor of the supply station 28 is coupled 700 to the rollers 52 of the unwinder 36 supporting the reel 22 intended to supply a green tyre manufacturing machine 14, and the reel is made to rotate. The end of the product is automatically joined 710 to a residual end of a previous product supplying the green tyre manufacturing machine, using the manipulator arm 68 of a joining station 66.

When the reel 22 is to be removed from the supply station 28, the reel is transferred 800 from the green tyre manufacturing machine 14 to the preparation station 32 using a mobile platform 40. The end of the elastomeric product 12 that is presented on the dispenser 58 of the unwinder 36 is wound 810 onto the reel in such a way that the end of the product is laid down onto the non-stick backing 18, and/or the non-stick backing is wound 820 onto the reel in such a way that the non-stick backing is no longer wound onto the bobbin 58, using the motor of the preparation station.

As a preference, two unwinders 36 supporting reels 22 containing an elastomeric product 12 with identical references are positioned 830 facing one another via their front face. The ends of the products presented on the dispenser 58 of the unwinders are joined together 840 using the manipulator arm 70. The product from one of the unwinders is wound 850 onto the other unwinder opposite.

The reel is unloaded 900 from the unwinder using the loading member. The reel is transferred 910 automatically from the preparation station to the storage area using the handling apparatus.

The environment of the green tyre manufacturing machine is scanned using the radar of a mobile platform 40. The green tyre manufacturing machine is identified within the environment using the controller of the mobile platform. The identified obstacles are circumnavigated when the mobile platform is moved.

After having received information that a mobile platform 40 has accomplished its mission to supply or to remove, the control unit 39 is used to transmit to the mobile platform an instruction to begin a new supply or removal mission. After the mobile platform has verified its battery level, a new supply or removal mission is begun. As soon as its battery level drops below a predetermined limit, a mobile platform is moved to the docking station.

The invention claimed is:

1. A method for supplying green tire manufacturing machines with elastomeric products by means of a supply facility,
    each elastomeric product being arranged on a non-stick backing,
    an assembly made up of the elastomeric product and the non-stick backing being wound onto a reel,
    the supply facility comprising a loading member and at least one transfer member comprising an unwinder,
    the supply facility further comprising a preparation station, the preparation station comprising a manipulator arm able to manipulate the elastomeric product and the non-stick backing and at least one motor able to drive rotation of the reel loaded onto the unwinder, and the preparation station and the unwinder being distinct from the green tire manufacturing machine, and the method comprising the following successive steps:

loading the reel onto the unwinder using the loading member;

positioning an end of the assembly wound on the reel using the motor of the preparation station;

arranging an end of the elastomeric product and an end of the non-stick backing in such a way that the end of the elastomeric product is laid on a dispenser of the unwinder and that the end of the non-stick backing is wound onto a bobbin of the unwinder, using the manipulator arm;

transferring the reel from the preparation station to the green tire manufacturing machine, using the at least one transfer member.

2. The method according to claim 1, further comprising, upstream of operation of loading the reel, the following step:

transferring the reel from a storage area to the preparation station using an autonomous handling apparatus belonging to the supply facility.

3. The method according to claim 2, wherein the reel is in a lying-down position in the storage area.

4. The method according to claim 2, wherein the loading member is arranged on the handling apparatus.

5. The method according to claim 1, wherein the supply facility comprises a joining station, the joining station comprising a collaborative manipulator arm, the method further comprising, downstream of transferring the reel into the green tire manufacturing machine, the following step:

joining the end of the elastomeric product to a residual end of a previous elastomeric product supplying the green tire manufacturing machine, using the manipulator arm.

6. The method according to claim 5, further comprising, downstream of joining, the following successive steps:

transferring the reel from the green tire manufacturing machine to the preparation station, using the transfer member;

winding onto the reel the end of the elastomeric product that is presented on the dispenser of the unwinder in such a way that the end of the elastomeric product is laid down onto the non-stick backing, or winding the non-stick backing onto the reel in such a way that the non-stick backing is no longer wound onto the bobbin, using the motor of the preparation station; and unloading the reel from the unwinder using the loading member.

7. The method according to claim 6, further comprising, downstream of unloading the reel, the following step:

transferring the reel from the preparation station to the storage area using the handling apparatus.

8. The method according to claim 1, wherein the reel is in an upright position during transfer using the transfer member.

9. A facility for supplying green tire manufacturing machines with elastomeric product, the product being arranged on a non-stick backing, and an assembly made up of the elastomeric product and the non-stick backing being wound onto a reel, the facility comprising:

a loading member;

a preparation station; and at least one transfer member capable of transferring the reel and comprising a unwinder onto which a reel can be loaded by means of the loading member, wherein the preparation station comprises a manipulator arm able to manipulate the elastomeric product and the non-stick backing and at least one motor able to drive rotation of the reel loaded onto the unwinder, wherein the unwinder comprises a dispenser able to support an end of the elastomeric product which has been unwound from the reel and a bobbin able to wind on the non-stick backing separated from the product, and wherein the preparation station and the unwinder are distinct from the green tire manufacturing machine.

10. The facility according to claim 9, further comprising a control unit, the loading member, the preparation station, and the transfer member each comprising means of communication with the control unit so as to receive mission instructions from the control unit and so as to communicate mission status information to the control unit.

* * * * *